(12) United States Patent
Terakawa et al.

(10) Patent No.: US 11,949,220 B2
(45) Date of Patent: Apr. 2, 2024

(54) CABLE BLOCKS

(71) Applicant: NIPPON TELEGRAPH AND TELEPHONE CORPORATION, Tokyo (JP)

(72) Inventors: Kuniaki Terakawa, Musashino (JP); Tomohiro Kawano, Musashino (JP); Tatsuya Fujimoto, Musashino (JP); Kazunori Katayama, Musashino (JP); Tomomi Nagao, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 220 days.

(21) Appl. No.: 17/637,762

(22) PCT Filed: Sep. 2, 2019

(86) PCT No.: PCT/JP2019/034477
§ 371 (c)(1),
(2) Date: Feb. 23, 2022

(87) PCT Pub. No.: WO2021/044498
PCT Pub. Date: Mar. 11, 2021

(65) Prior Publication Data
US 2022/0320846 A1 Oct. 6, 2022

(51) Int. Cl.
*H02G 3/38* (2006.01)
*H02G 1/00* (2006.01)
(52) U.S. Cl.
CPC ............... *H02G 3/38* (2013.01); *H02G 1/00* (2013.01)

(58) Field of Classification Search
None
See application file for complete search history.

(56) References Cited

U.S. PATENT DOCUMENTS 3,816,818 A * 6/1974 Meier .................. H01R 12/675
439/492
5,167,526 A * 12/1992 Pinyan ..................... H01R 4/32
439/411
(Continued)

FOREIGN PATENT DOCUMENTS

| JP | H01283009 A | 11/1989 |
|---|---|---|
| JP | 2003087361 A | 3/2003 |
| JP | 2006301895 A | 11/2006 |

*Primary Examiner* — Krystal Robinson
(74) *Attorney, Agent, or Firm* — Harness, Dickey & Pierce, P.L.C.

(57) ABSTRACT

In a block (10) for a cable of the present disclosure, the block has a shape of a rectangular cuboid in which an upper surface (11) and a bottom surface have square shapes, the block has plural bending through holes (21) between one side surface of the rectangular cuboid and a side surface (12) neighboring the one side surface, arrangement of open ends (22) of the plural through holes in the one side surface of the rectangular cuboid is in a lattice manner, the arrangement of the open ends is in line symmetry with respect to a middle line (31) between an upper side and a bottom side of the one side surface and with respect to a middle line (32) between a lateral side and a lateral side of the one side surface, and arrangement of open ends (22) of the plural through holes in the side surface neighboring the one side surface of the rectangular cuboid is the same as the arrangement of the open ends (22) of the plural through holes in the one side surface of the rectangular cuboid.

7 Claims, 12 Drawing Sheets

(56) References Cited

U.S. PATENT DOCUMENTS

| | | | | |
|---|---|---|---|---|
| 5,879,285 | A * | 3/1999 | Ishii | A61B 1/00167 |
| | | | | 600/110 |
| 6,402,541 | B1 * | 6/2002 | Mindeau | H01R 4/2425 |
| | | | | 439/417 |
| 8,348,204 | B2 * | 1/2013 | Kataoka | B61D 49/00 |
| | | | | 248/68.1 |
| 9,287,634 | B2 * | 3/2016 | Kawamura | H01R 4/206 |
| 9,484,727 | B1 * | 11/2016 | Eichelberg | H02G 3/22 |
| 11,211,780 | B1 * | 12/2021 | Chang | H05K 5/0247 |
| 2003/0050089 | A1 | 3/2003 | Ogino et al. | |
| 2015/0295359 | A1 * | 10/2015 | Vinther | H01R 13/6473 |
| | | | | 439/578 |

\* cited by examiner

[9]

[10]

CABLE BLOCKS

CROSS-REFERENCE TO RELATED APPLICATIONS

This application is a 371 U.S. National Phase of International Application No. PCT/JP2019/034477, filed on Sep. 2, 2019. The entire disclosure of the above application is incorporated herein by reference.

TECHNICAL FIELD

The present disclosure relates to a block for a cable which is used for wiring of the cable, a block group for a cable in which the plural blocks for a cable are coupled together, a configuration method of a block for a cable, the configuration method using the block for a cable, and a wiring method using the block group for a cable, in a communication station building or a data center.

BACKGROUND ART

In a communication station building or a data center, reduction in running costs and improvements in work and maintainability are always demanded. Thus, for restriction of floor height, effective use of existing buildings, and so forth, a double-floor structure is used for a floor of a story, and cables for communication and power are laid in a space under a double floor.

In laying a cable in a space under the double floor, in order to suppress material costs, a route of a cable has been designed to become as short as possible. As such a design technique, a system has been discussed which automatically designs an optimal wiring route satisfying several conditions such as cable costs (see Patent Literature 1). Alternatively, in a case where the shortest route cannot be employed, design has been made which provides a route to be easily laid.

CITATION LIST

Patent Literature

Patent Literature 1: Japanese Patent Laid-Open No. 2006-301895

SUMMARY OF THE INVENTION

Technical Problem

In related art, there has been a problem that in every cable laying work, a cable is arranged depending on the situation, resulting in that cables are concentrated into a part, and the cables are piled up. As a result, an air-conditioning airflow for cooling devices does not efficiently flow through a space under a double floor.

Means for Solving the Problem

The present disclosure is to solve the above problems and provides blocks for a cable which is used by coupling together and has a through hole through which a cable is caused to pass.

Specifically, in a block for a cable of the present disclosure, the block has a shape of a rectangular cuboid in which an upper surface and a bottom surface have square shapes, the block has plural bending through holes between one side surface of the rectangular cuboid and a side surface neighboring the one side surface, arrangement of open ends of the plural through holes in the one side surface of the rectangular cuboid is in a lattice manner, the arrangement of the open ends is in line symmetry with respect to a middle line between an upper side and a bottom side of the one side surface and with respect to a middle line between a lateral side and a lateral side of the one side surface, and arrangement of open ends of the plural through holes in the side surface neighboring the one side surface of the rectangular cuboid is the same as the arrangement of the open ends of the plural through holes in the one side surface of the rectangular cuboid.

Specifically, in a block for a cable of the present disclosure, the block has a shape of a rectangular cuboid in which an upper surface and a bottom surface have square shapes, the block has plural through holes extending straight between one side surface of the rectangular cuboid and a side surface opposed to the one side surface, arrangement of open ends of the plural through holes in the one side surface of the rectangular cuboid is in a lattice manner and corresponds, of a first group and a second group, to the first group wherein the first group and the second group are defined so that alignment in line symmetry with respect to a middle line between an upper side and a bottom side of the one side surface and with respect to a middle line between a lateral side and a lateral side of the one side surface is divided into the first group and the second group, the open ends at the same height from the bottom surface belonging to the same group, the open ends of the first group and the open ends of the second group being in rotational symmetry with respect to a center of the one side surface, and arrangement of open ends of the plural through holes in the side surface opposed to the one side surface of the rectangular cuboid is the same as the arrangement of the open ends of the plural through holes in the one side surface of the rectangular cuboid.

Specifically, in a block for a cable of the present disclosure, the block has a shape of a rectangular cuboid in which an upper surface and a bottom surface have square shapes, the block has plural through holes extending straight between one side surface of the rectangular cuboid and a side surface opposed to the one side surface, the block has plural through holes extending straight between side surfaces neighboring the one side surface of the rectangular cuboid, arrangement of open ends of the plural through holes in the one side surface of the rectangular cuboid is in a lattice manner and corresponds, of a first group and a second group, to the first group wherein the first group and the second group are defined so that alignment in line symmetry with respect to a middle line between an upper side and a bottom side of the one side surface and with respect to a middle line between a lateral side and a lateral side of the one side surface is divided into the first group and the second group, the open ends at the same height from the bottom surface belonging to the same group, the open ends of the first group and the open ends of the second group being in rotational symmetry with respect to a center of the one side surface, and arrangement of open ends of the plural through holes in the side surface neighboring the one side surface of the rectangular cuboid corresponds to the second group.

Specifically, in a block for a cable of the present disclosure, the block has a shape of a rectangular cuboid in which an upper surface and a bottom surface have square shapes, the block has plural through holes extending straight between one side surface of the rectangular cuboid and a side surface opposed to the one side surface, arrangement of open ends of the plural through holes in the one side surface of the rectangular cuboid is in a lattice manner, the arrangement of the open ends is in line symmetry with respect to a middle line between an upper side and a bottom side of the one side surface and with respect to a middle line between a lateral side and a lateral side of the one side surface, and arrangement of open ends of the plural through holes in the side surface opposed to the one side surface of the rectangular cuboid is the same as the arrangement of the open ends of the plural through holes in the one side surface of the rectangular cuboid.

Effects of the Invention

When a block for a cable of the present disclosure is used, a cable is prevented from being piled up due to concentration of the cable into a part.

DESCRIPTION OF EMBODIMENTS

Figure 1:
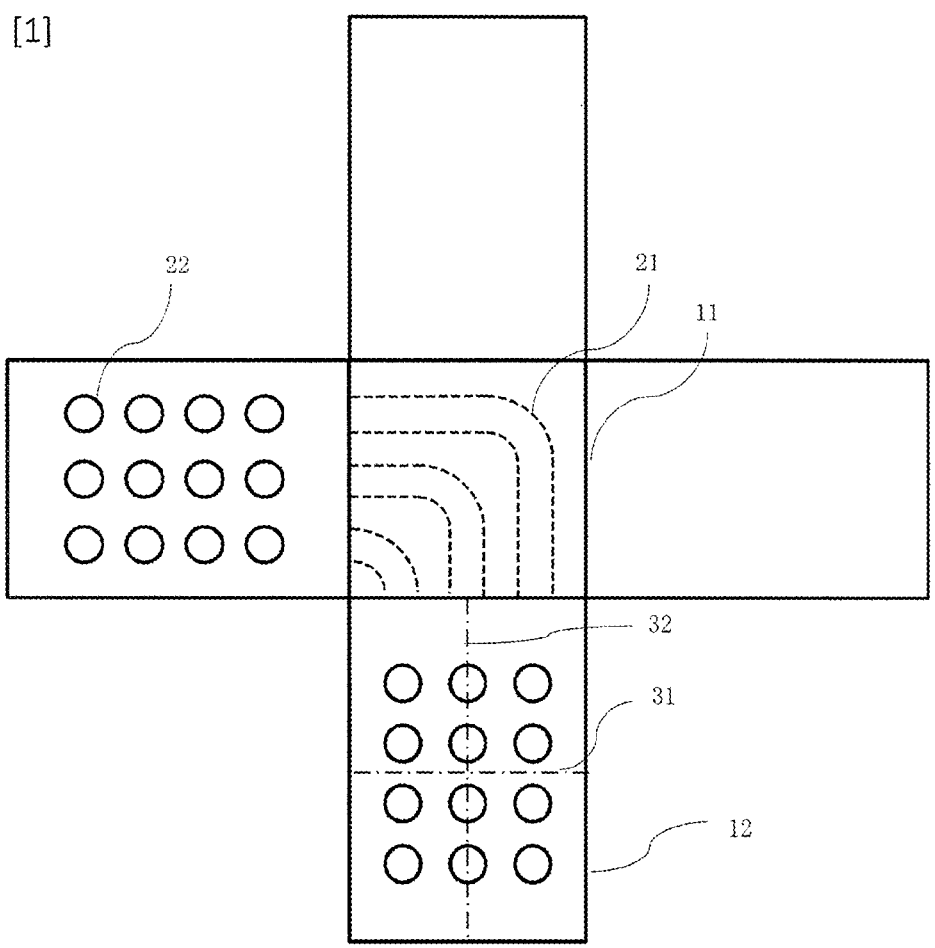
FIG. 1 is a geometry net of a block for a cable of "type A".

Embodiments of the present disclosure will hereinafter be described in detail with reference to drawings. Note that the present disclosure is not limited to the embodiments described in the following. Those embodiments are merely examples, and the present disclosure can be practiced in forms to which various modifications and improvements are applied based on knowledge of persons skilled in the art. Note that it is assumed that the configuration elements with the same reference characters in the present specification and drawings mutually represent the same configuration elements.

(Block for Cable of "Type A")

In a block for a cable of the present disclosure, the block has a shape of a rectangular cuboid in which an upper surface and a bottom surface have square shapes, the block has plural bending through holes between one side surface of the rectangular cuboid and a side surface neighboring the one side surface, arrangement of open ends of the plural through holes in the one side surface of the rectangular cuboid is in a lattice manner, the arrangement of the open ends is in line symmetry with respect to a middle line between an upper side and a bottom side of the one side surface and with respect to a middle line between a lateral side and a lateral side of the one side surface, and arrangement of open ends of the plural through holes in the side surface neighboring the one side surface of the rectangular cuboid is the same as the arrangement of the open ends of the plural through holes in the one side surface of the rectangular cuboid.

A configuration of the block for a cable of the present disclosure will be described with reference to FIG. 1. FIG. 1 is a geometry net of a block for a cable of "type A". The block for a cable of the present disclosure has a shape of a rectangular cuboid in which an upper surface and a bottom surface have square shapes. The geometry net of FIG. 1 illustrates the block for a cable which is unfolded while the upper surface of the rectangular cuboid shape of the block for a cable is positioned at the center and side surfaces of the rectangular cuboid shape are positioned on upper, lower, left, and right sides of the center. The bottom surface is not illustrated. In FIG. 1, a reference numeral 11 denotes an upper surface, a reference numeral 12 denotes a side surface, a reference numeral 21 denotes a through hole, a reference numeral 22 denotes an open end of the through hole 21, a reference numeral 31 denotes a middle line between an upper side and a bottom side of the side surface, and a reference numeral 32 denotes a middle line of a lateral side and a lateral side of the side surface 12.

The block for a cable of "type A" has, on the inside, plural through holes 21 through which a cable is caused to pass. The through holes 21 do not intersect with each other on the inside of the block for a cable. An entry direction and an exit direction of every through hole 21 form an angle of 90 degrees when seen from an upper surface direction. The through hole 21 connects one side surface of the rectangular cuboid with the side surface neighboring that.

As illustrated in FIG. 1, each of two neighboring side surfaces 12 of the rectangular cuboid has the open end 22 of the through hole 21. In one side surface 12, plural open ends 22 are arranged in the positions of lattice points of a lattice. In the present disclosure, the open ends 22 are arranged in three columns in a vertical direction and in four rows in a horizontal direction. In the horizontal direction, alignment with even rows is preferable. The plural open ends 22 are arranged in line symmetry with respect to the middle line 31 between the upper side and the bottom side of the side surface 12 and, in addition, aligned in line symmetry with respect to the middle line 32 between the lateral side and the lateral side of the side surface 12.

In the side surface 12 neighboring the side surface described in the previous paragraph, the open ends 22 are arranged in the same manner. As illustrated in FIG. 1, the open ends of neighboring side surfaces are connected together by the through holes bending at 90 degrees.

In installing the block for a cable of "type A", the block for a cable is rotated by a unit of 90 degrees around, as the center, a perpendicular axis connecting the center of the upper surface with the center of the bottom surface, and a cable can thereby be caused to pass through the block while bending in arbitrary directions such as forward and leftward, leftward and rearward, rearward and rightward, or rightward and forward. Further, in installing the block for a cable of "type A", even when upper and lower sides of the block for a cable of "type A" are inverted, the block is structurally the same.

When the block for a cable of the present disclosure is used, a cable is prevented from being piled up due to concentration of the cable into a part.

(Block for Cable of "Type B")

In a block for a cable of the present disclosure, the block has a shape of a rectangular cuboid in which an upper surface and a bottom surface have square shapes, the block has plural through holes extending straight between one side surface of the rectangular cuboid and a side surface opposed to the one side surface, arrangement of open ends of the plural through holes in the one side surface of the rectangular cuboid is in a lattice manner and corresponds, of a first group and a second group, to the first group wherein the first group and the second group are defined so that alignment in line symmetry with respect to a middle line between an upper side and a bottom side of the one side surface and with respect to a middle line between a lateral side and a lateral side of the one side surface is divided into the first group and the second group, the open ends at the same height from the bottom surface belonging to the same group, the open ends of the first group and the open ends of the second group being in rotational symmetry with respect to a center of the one side surface, and arrangement of open ends of the plural through holes in the side surface opposed to the one side surface of the rectangular cuboid is the same as the arrangement of the open ends of the plural through holes in the one side surface of the rectangular cuboid.

Figure 2:
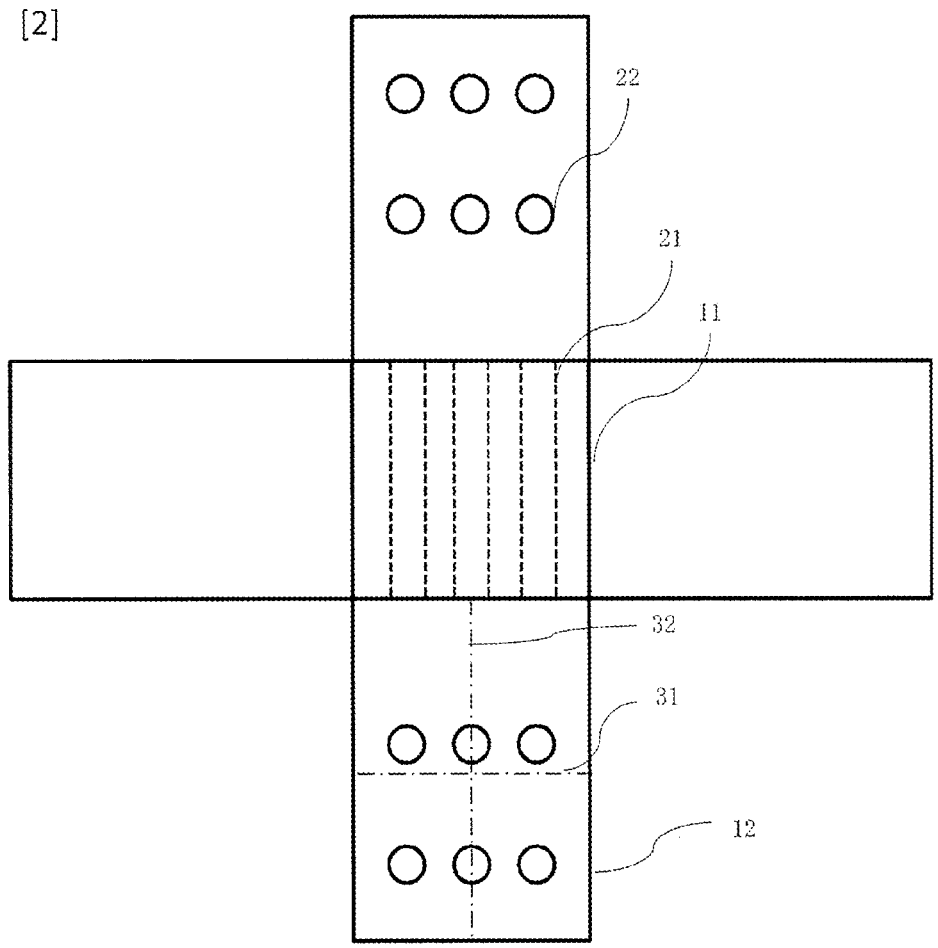
FIG. 2 is a geometry net of a block for a cable of "type B".
Figure 5:
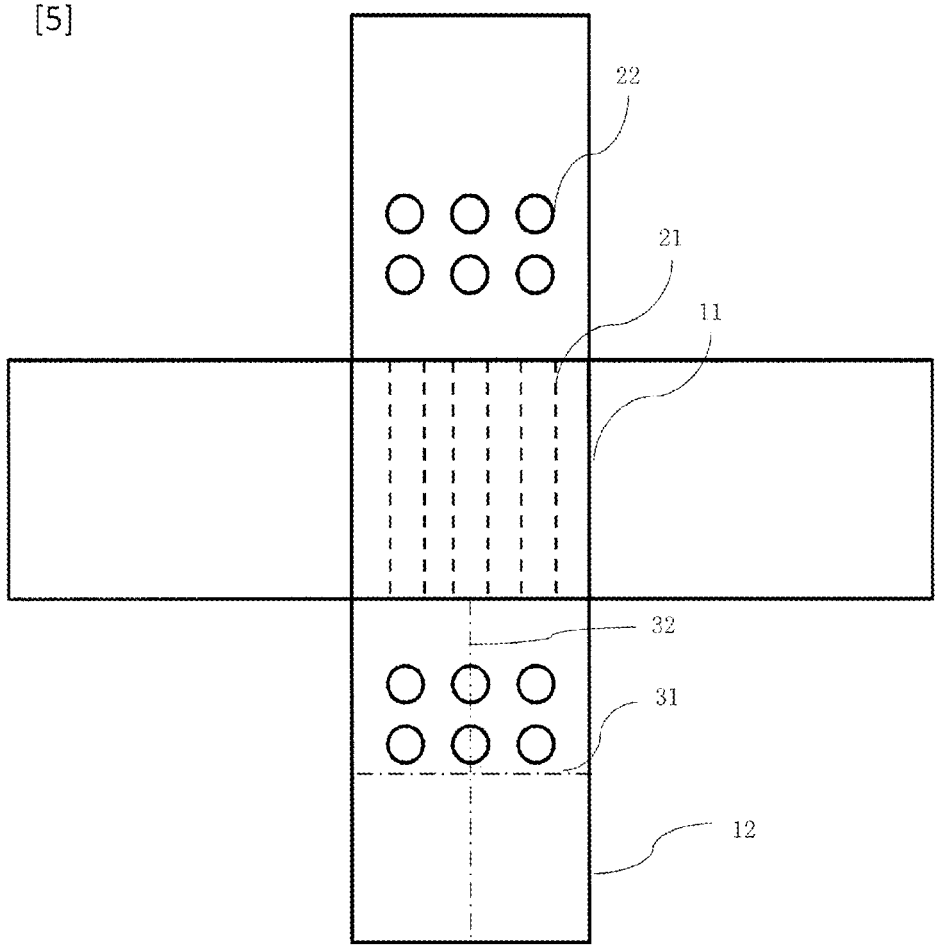
FIG. 5 is a geometry net of the block for a cable of "type B".

A configuration of the block for a cable of the present disclosure will be described with reference to FIG. 2 and FIG. 5. FIG. 2 and FIG. 5 are geometry nets of a block for a cable of "type B". The block for a cable of the present disclosure has a shape of a rectangular cuboid in which an upper surface and a bottom surface have square shapes. The geometry nets of FIG. 2 and FIG. 5 illustrate the block for a cable which is unfolded while the upper surface of the rectangular cuboid shape of the block for a cable is positioned at the center and side surfaces of the rectangular cuboid shape are positioned on upper, lower, left, and right sides of the center. The bottom surface is not illustrated. In FIG. 2 and FIG. 5, a reference numeral 11 denotes an upper surface, a reference numeral 12 denotes a side surface, a reference numeral 21 denotes a through hole, a reference numeral 22 denotes an open end of the through hole 21, a reference numeral 31 denotes a middle line between an upper side and a bottom side of the side surface, and a reference numeral 32 denotes a middle line of a lateral side and a lateral side of the side surface 12.

The block for a cable of "type B" has, on the inside, plural through holes 21 through which a cable is caused to pass. The through holes 21 do not intersect with each other on the inside of the block for a cable. An entry direction and an exit direction of every through hole 21 are the same direction. The through hole 21 connects one side surface of the rectangular cuboid with the side surface opposed to that.

As illustrated in FIG. 2 and FIG. 5, each of two opposed side surfaces 12 of the rectangular cuboid has the open end 22 of the through hole 21. In one side surface 12, plural open ends 22 are arranged in the positions of lattice points of a lattice. In the present disclosure, the open ends 22 are arranged in three columns in a vertical direction and in two rows in a horizontal direction.

Plural open ends are assumed which are aligned in line symmetry with respect to the middle line between the upper side and the bottom side of the side surface and, in addition, aligned in line symmetry with respect to the middle line between the lateral side and the lateral side of the side surface. For example, plural open ends are assumed which are arranged in the side surface in FIG. 1, and those open ends are divided into a first group and a second group. The open ends at the same height from the bottom surface belong to the same group. Plural open ends of the first group and plural open ends of the second group are aligned in rotational symmetry with respect to the center of the side surface. The center of the side surface denotes the intersection of the middle line 31 and the middle line 32 in FIG. 1.

In order to satisfy a condition in the previous paragraph, when the open ends in the even rows among the open ends in FIG. 1 are set as the first group and the open ends in the odd rows are set as the second group, the first group is selected in one side surface and the side surface opposed to the one side surface which are illustrated in FIG. 2 of the present disclosure.

In order to satisfy the condition in the further previous paragraph, when upper-half open ends among the open ends in FIG. 1 are set as the first group and lower-half open ends are set as the second group, the first group is selected in one side surface and the side surface opposed to the one side surface which are illustrated in FIG. 5 of the present disclosure.

As illustrated in FIG. 2 and FIG. 5, the open ends of the opposed side surfaces are connected together by the through holes extending straight.

In installing the block for a cable of "type B", the block for a cable is rotated by 90 degrees around, as the center, a perpendicular axis connecting the center of the upper surface with the center of the bottom surface, and a cable can thereby be caused to pass through the block in arbitrary directions such as forward and rearward or leftward and rightward. Further, in installing the block for a cable of "type B", the above-described second group is selected by inverting upper and lower sides. In other words, the heights of the through holes can be switched.

When the block for a cable of the present disclosure is used, a cable is prevented from being piled up due to concentration of the cable into a part.

(Block for Cable of "Type C")

In a block for a cable of the present disclosure, the block has a shape of a rectangular cuboid in which an upper surface and a bottom surface have square shapes, the block has plural through holes extending straight between one side surface of the rectangular cuboid and a side surface opposed to the one side surface, the block has plural through holes extending straight between side surfaces neighboring the one side surface of the rectangular cuboid, arrangement of open ends of the plural through holes in the one side surface of the rectangular cuboid is in a lattice manner and corresponds, of a first group and a second group, to the first group wherein the first group and the second group are defined so that alignment in line symmetry with respect to a middle line between an upper side and a bottom side of the one side surface and with respect to a middle line between a lateral side and a lateral side of the one side surface is divided into the first group and the second group, the open ends at the same height from the bottom surface belonging to the same group, the open ends of the first group and the open ends of the second group being in rotational symmetry with respect to a center of the one side surface, and arrangement of open ends of the plural through holes in the side surface neighboring the one side surface of the rectangular cuboid corresponds to the second group.

Figure 3:
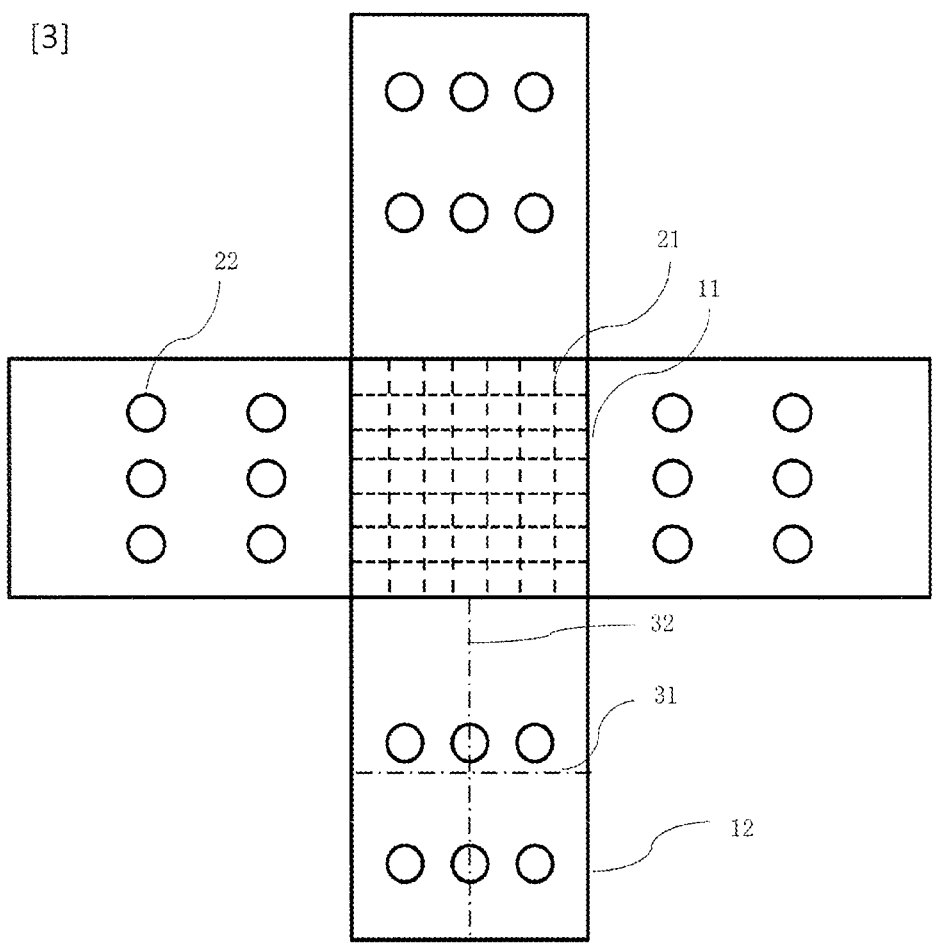
FIG. 3 is a geometry net of a block for a cable of "type C".
Figure 6:
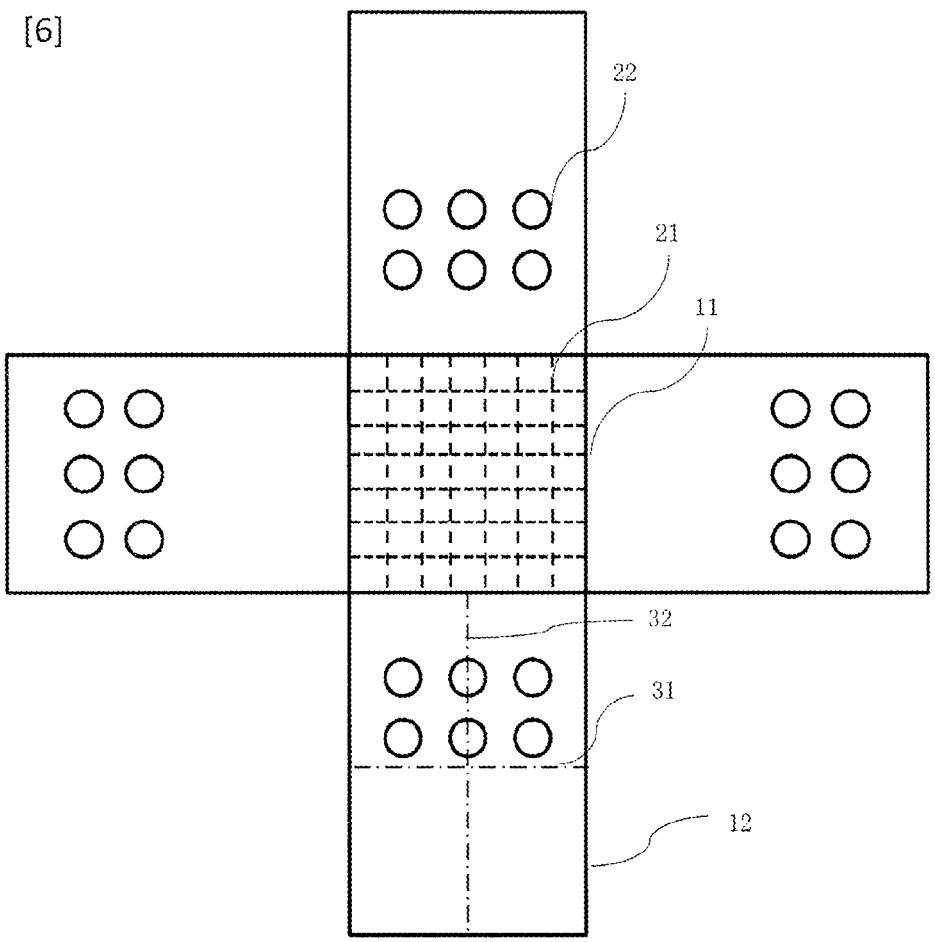
FIG. 6 is a geometry net of the block for a cable of "type C".

A configuration of the block for a cable of the present disclosure will be described with reference to FIG. 3 and FIG. 6. FIG. 3 and FIG. 6 are geometry nets of a block for a cable of "type C". The block for a cable of the present disclosure has a shape of a rectangular cuboid in which an upper surface and a bottom surface have square shapes. The geometry nets of FIG. 3 and FIG. 6 illustrate the block for a cable which is unfolded while the upper surface of the rectangular cuboid shape of the block for a cable is positioned at the center and side surfaces of the rectangular cuboid shape are positioned on upper, lower, left, and right sides of the center. The bottom surface is not illustrated. In FIG. 3 and FIG. 6, a reference numeral 11 denotes an upper surface, a reference numeral 12 denotes a side surface, a reference numeral 21 denotes a through hole, a reference numeral 22 denotes an open end of the through hole 21, a reference numeral 31 denotes a middle line between an upper side and a bottom side of the side surface, and a reference numeral 32 denotes a middle line of a lateral side and a lateral side of the side surface 12.

The block for a cable of "type C" has, on the inside, plural through holes 21 through which a cable is caused to pass. The through holes 21 do not intersect with each other on the inside of the block for a cable. An entry direction and an exit direction of every through hole 21 are the same direction. The through hole 21 connects one side surface of the rectangular cuboid with the side surface opposed to that.

As illustrated in FIG. 3 and FIG. 6, each of four side surfaces 12 of the rectangular cuboid has the open end 22 of the through hole 21. In one side surface 12, plural open ends 22 are arranged in the positions of lattice points of a lattice. In the present disclosure, the open ends 22 are arranged in three columns in a vertical direction and in two rows in a horizontal direction.

Plural open ends are assumed which are aligned in line symmetry with respect to the middle line between the upper side and the bottom side of the side surface and, in addition, aligned in line symmetry with respect to the middle line between the lateral side and the lateral side of the side surface. For example, plural open ends are assumed which are arranged in the side surface in FIG. 1, and those open ends are divided into a first group and a second group. The open ends at the same height from the bottom surface belong to the same group. Plural open ends in the first group and plural open ends in the second group are aligned in rotational symmetry with respect to the center of the side surface. The center of the side surface denotes the intersection of the middle line 31 and the middle line 32 in FIG. 1.

In order to satisfy a condition in the previous paragraph, when the open ends in the even rows among the open ends in FIG. 1 are set as the first group and the open ends in the odd rows are set as the second group, the first group is selected in one side surface and the side surface opposed to the one side surface which are illustrated in FIG. 3 of the present disclosure. Further, the second group is selected in two side surfaces neighboring the one side surface.

In order to satisfy the condition in the further previous paragraph, when upper-half open ends among the open ends in FIG. 1 are set as the first group and lower-half open ends are set as the second group, the first group is selected in one side surface and the side surface opposed to the one side surface which are illustrated in FIG. 6 of the present disclosure. Further, the second group is selected in two side surfaces neighboring the one side surface.

As illustrated in FIG. 3 and FIG. 6, the open ends of the opposed side surfaces are connected together by the through holes extending straight.

The different group from the neighboring side surface is selected, and the through holes connecting one side surface and the side surface opposed to the one side surface and the through holes connecting the side surfaces neighboring the one side surface together thereby have different heights from the bottom surface. Thus, the through holes 21 in two directions do not intersect with each other on the inside of the block for a cable.

In installing the block for a cable of "type C", the block for a cable is rotated by 90 degrees around, as the center, a perpendicular axis connecting the center of the upper surface with the center of the bottom surface, and the above-descried first group and second group can thereby be switched. In other words, the heights of the through holes can be switched between a front-rear direction and a left-right direction. Further, in installing the block for a cable of "type C", the first group and the second group described above can also be switched by inverting upper and lower sides.

When the block for a cable of the present disclosure is used, a cable is prevented from being piled up due to concentration of the cable into a part.

(Block for Cable of "Type D")

In a block for a cable of the present disclosure, the block has a shape of a rectangular cuboid in which an upper surface and a bottom surface have square shapes, the block has plural through holes extending straight between one side surface of the rectangular cuboid and a side surface opposed to the one side surface, arrangement of open ends of the plural through holes in the one side surface of the rectangular cuboid is in a lattice manner, the arrangement of the open ends is in line symmetry with respect to a middle line between an upper side and a bottom side of the one side surface and with respect to a middle line between a lateral side and a lateral side of the one side surface, and arrangement of open ends of the plural through holes in the side surface opposed to the one side surface of the rectangular cuboid is the same as the arrangement of the open ends of the plural through holes in the one side surface of the rectangular cuboid.

Figure 4:
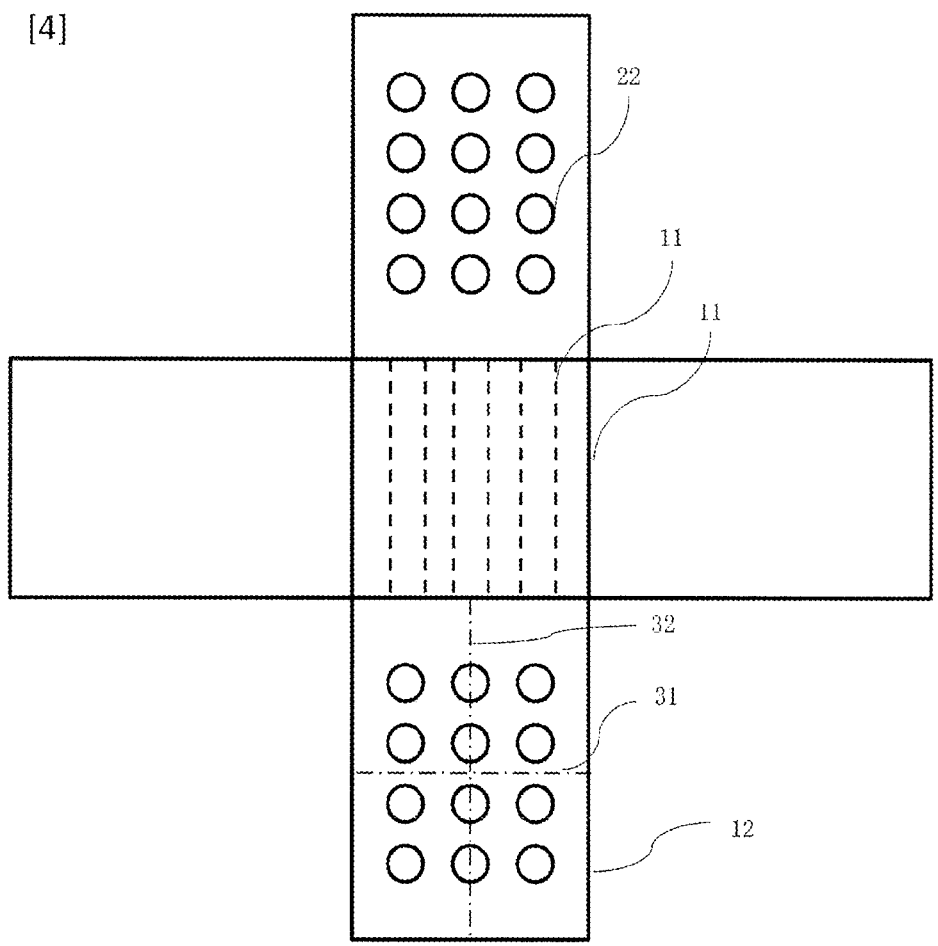
FIG. 4 is a geometry net of a block for a cable of "type D".

A configuration of the block for a cable of the present disclosure will be described with reference to FIG. 4. FIG. 4 is a geometry net of a block for a cable of "type D". The block for a cable of the present disclosure has a shape of a rectangular cuboid in which an upper surface and a bottom surface have square shapes. The geometry net of FIG. 4 illustrates the block for a cable which is unfolded while the upper surface of the rectangular cuboid shape of the block for a cable is positioned at the center and side surfaces of the rectangular cuboid shape are positioned on upper, lower, left, and right sides of the center. The bottom surface is not illustrated. In FIG. 4, a reference numeral 11 denotes an upper surface, a reference numeral 12 denotes a side surface, a reference numeral 21 denotes a through hole, a reference numeral 22 denotes an open end of the through hole 21, a reference numeral 31 denotes a middle line between an upper side and a bottom side of the side surface, and a reference numeral 32 denotes a middle line of a lateral side and a lateral side of the side surface 12.

The block for a cable of "type D" has, on the inside, plural through holes 21 through which a cable is caused to pass. The through holes 21 do not intersect with each other on the inside of the block for a cable. An entry direction and an exit direction of every through hole 21 are the same direction. The through hole 21 connects one side surface of the rectangular cuboid with the side surface opposed to that.

As illustrated in FIG. 4, each of two neighboring side surfaces 12 of the rectangular cuboid has the open end 22 of the through hole 21. In one side surface 12, plural open ends 22 are arranged in the positions of lattice points of a lattice. In the present disclosure, the open ends 22 are arranged in three columns in a vertical direction and in four rows in a horizontal direction. In the horizontal direction, alignment with even rows is preferable. The plural open ends 22 are arranged in line symmetry with respect to the middle line 31 between the upper side and the bottom side of the side surface 12 and, in addition, aligned in line symmetry with respect to the middle line 32 between the lateral side and the lateral side of the side surface 12.

In the side surface 12 opposed to the side surface described in the previous paragraph, the open ends 22 are arranged in the same manner. As illustrated in FIG. 4, the open ends of the opposed side surfaces are connected together by the through holes extending straight.

In installing the block for a cable of "type D", the block for a cable is rotated by 90 degrees around, as the center, a perpendicular axis connecting the center of the upper surface with the center of the bottom surface, and a cable can thereby be caused to pass through the block in arbitrary directions such as forward and rearward or leftward and rightward. Further, in installing the block for a cable of "type D", even when upper and lower sides are inverted, the block is structurally the same.

When the block for a cable of the present disclosure is used, a cable is prevented from being piled up due to concentration of the cable into a part.

(Block Group for Cable and Configuration Method Thereof)

In a block group for a cable of the present disclosure, the plural blocks for a cable according to any one of the above descriptions, which have bottom surfaces with the same size and the same height and between side surfaces of which arrangements of open ends of plural through holes correspond to each other, are coupled together via side surfaces.

In a configuration method of a block group for a cable of the present disclosure, the plural blocks for a cable according to any one of the above descriptions, which have bottom surfaces with the same size and the same height and between side surfaces of which arrangements of open ends of plural through holes correspond to each other, are coupled together via side surfaces, and a cable wiring route is secured.

As for the block group for a cable of the present disclosure, the above-described blocks for a cable of "type A", "type B", "type C", and "type D" are dealt with as one group. The block for a cable of each of the types has a bottom surface with the same size and the same height, and when the blocks are coupled together via side surfaces, the upper surfaces and the side surfaces of the blocks for a cable are uniformly situated. In addition, arrangements of the open ends of plural through holes are caused to correspond to each other between the side surfaces. That is, it is preferable that the blocks for a cable which are illustrated in FIG. 1, FIG. 2, FIG. 3, and FIG. 4 form one group, and it is preferable that the blocks for a cable which are illustrated in FIG. 1, FIG. 5, FIG. 6, and FIG. 4 form one group. Because the positions of the open ends of the through holes of the blocks for a cable of arbitrary types correspond to each other in the group, plural blocks for a cable are coupled together via the side surfaces, a cable is caused to pass through the through holes, and a cable wiring route can thereby be secured.

A state where the positions of the open ends of the through holes correspond to each other indicates a state where the position of the open end of the through hole of the block for a cable of "type D" agrees with any position of the open ends of the through holes of the block for a cable of "type A", for example. Further, a state where the positions of the open ends of the through holes correspond to each other indicates a state where the position of the open end of the through hole of the block for a cable of "type B" or the block for a cable of "type C" agrees with the position of the open end of the through hole of the block for a cable of "type A", for example.

Figure 7:
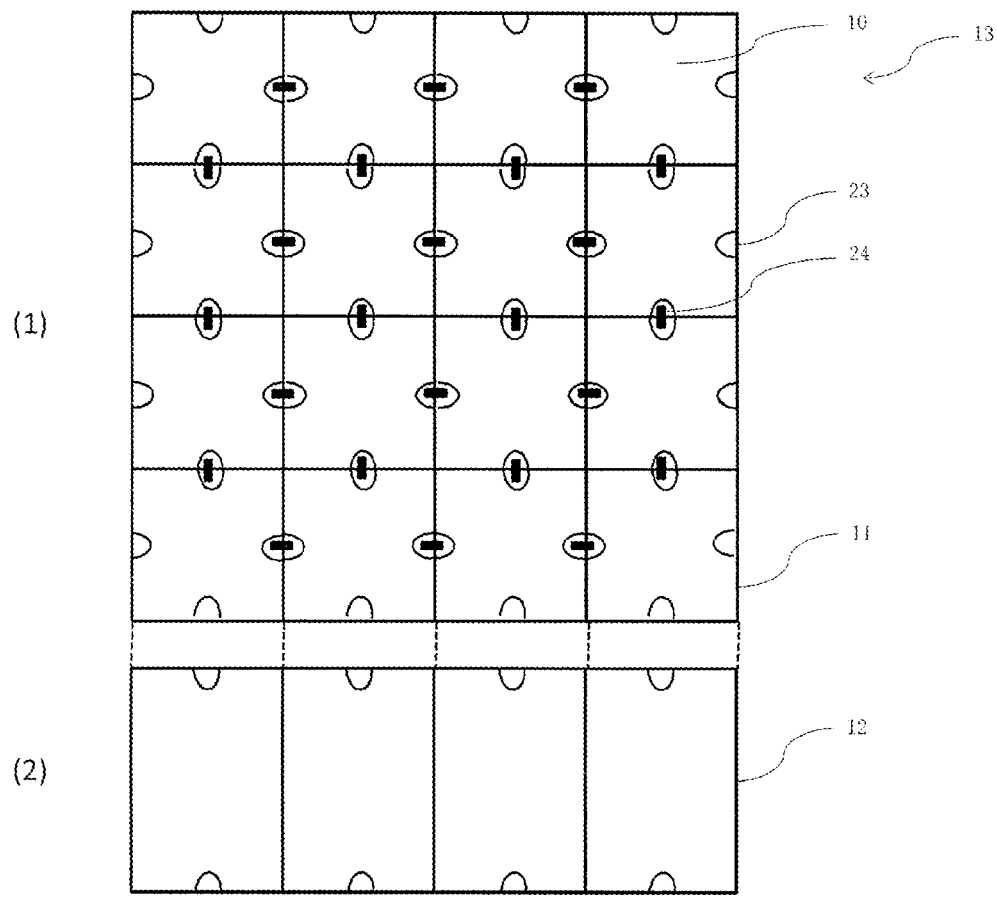
FIG. 7 illustrates a top view and a front view of a block group for a cable.

A configuration example of the block group for a cable of the present disclosure will be described with reference to FIG. 7. FIG. 7(1) represents a top view of the block group for a cable, and FIG. 7(2) represents a front view of the block group for a cable. A bottom view is the same as the top view, and two side views and a back view are the same as the front view. In FIG. 7, a reference numeral 10 denotes a block for a cable, a reference numeral 11 denotes an upper surface, a reference numeral 12 denotes a side surface, a reference numeral 13 denotes a block group for a cable, a reference numeral 21 denotes a through hole, a reference numeral 23 denotes a coupling recess portion, and a reference numeral 24 denotes a coupling fixing jig. The coupling recess portions 23 are provided to sides at which the upper surface contacts with the side surfaces and to sides at which the bottom surface contacts with the side surfaces. The coupling recess portion 23 may be provided in another location than those. It is sufficient that the coupling recess portion 23 has a structure that can couple plural blocks 10 for a cable via the side surfaces even when the block 10 for a cable is rotated by 90 degrees around, as the center, a perpendicular axis connecting the center of the upper surface with the center of the bottom surface or even when upper and lower sides are inverted. In FIG. 7(1), the blocks for a cable are coupled together by the coupling recess portions 23 and the coupling fixing jigs 24, but latches may be used.

When the block group 13 for a cable of the present disclosure is used, a cable is prevented from being piled up due to concentration of the cable into a part. In addition, a cable can be caused to pass through in an arbitrary direction.

Configuration examples of the block groups for a cable of the present disclosure will be illustrated in FIG. 8 to FIG. 11. In FIG. 8 to FIG. 11, a reference numeral 10 denotes a block for a cable, a reference numeral 11 denotes an upper surface of the block 10 for a cable, a reference numeral 12 denotes a through hole, a reference numeral 13 denotes a block group for a cable, and reference characters A, B, C, and D respectively denote "type A", "type B", "type C", and "type D" of the block 10 for a cable. In FIG. 8 to FIG. 11, 16 blocks 10 for a cable are coupled together in 4 vertical columns and in 4 horizontal rows.

Figure 8:
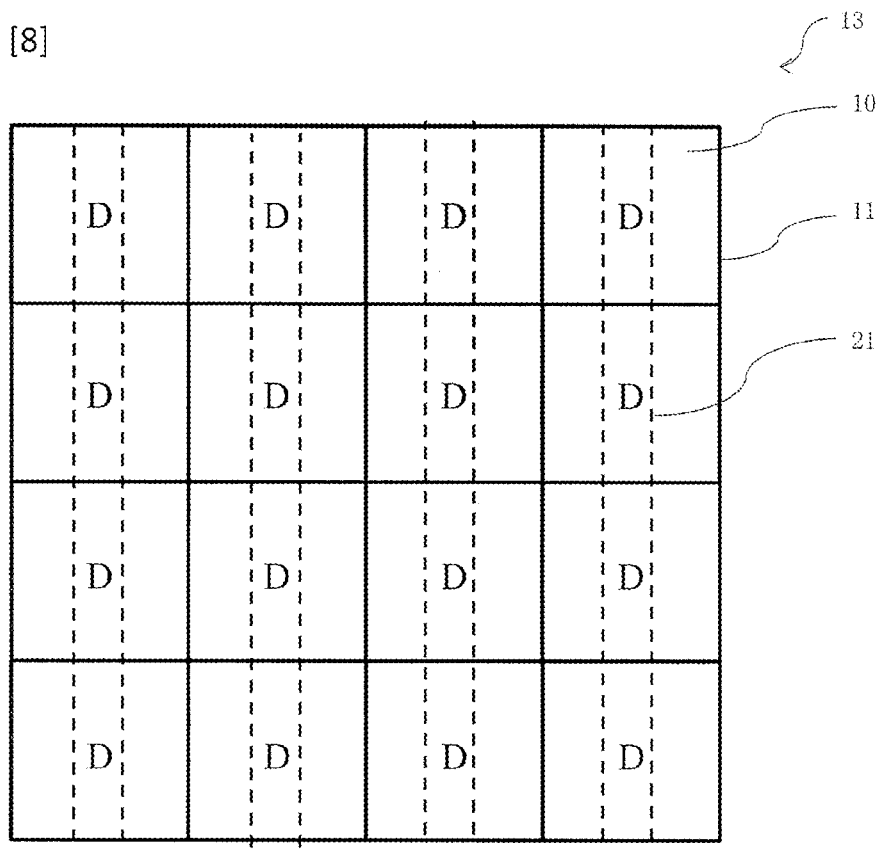
FIG. 8 illustrates a configuration example of a block group for a cable.

As for the blocks for a cable in FIG. 8, 16 blocks for a cable of "type D" are coupled together in 4 vertical columns and in 4 horizontal rows such that the through holes are directed in the same direction. This will be referred to as a block group for a cable of "I" pattern. The block group 13 for a cable of "I" pattern causes a cable from a neighboring block group for a cable to pass through the block group 13 of "I" pattern to the neighboring block group for a cable on the opposite side in the same direction.

In installing the block group 13 for a cable of "I" pattern, the block group 13 for a cable is rotated by 90 degrees around, as the center, a perpendicular axis connecting the center of an upper surface with the center of a bottom surface, and a cable can thereby be caused to pass through the block group forward and rearward or leftward and rightward. Further, in installing the block group 13 for a cable of "I" pattern, even when upper and lower sides of the block group 13 for a cable of "I" pattern are inverted, the block group 13 is structurally the same.

When the number of cables is small, the block for a cable of "type B" may be coupled instead of the block for a cable of "type D".

Figure 9:
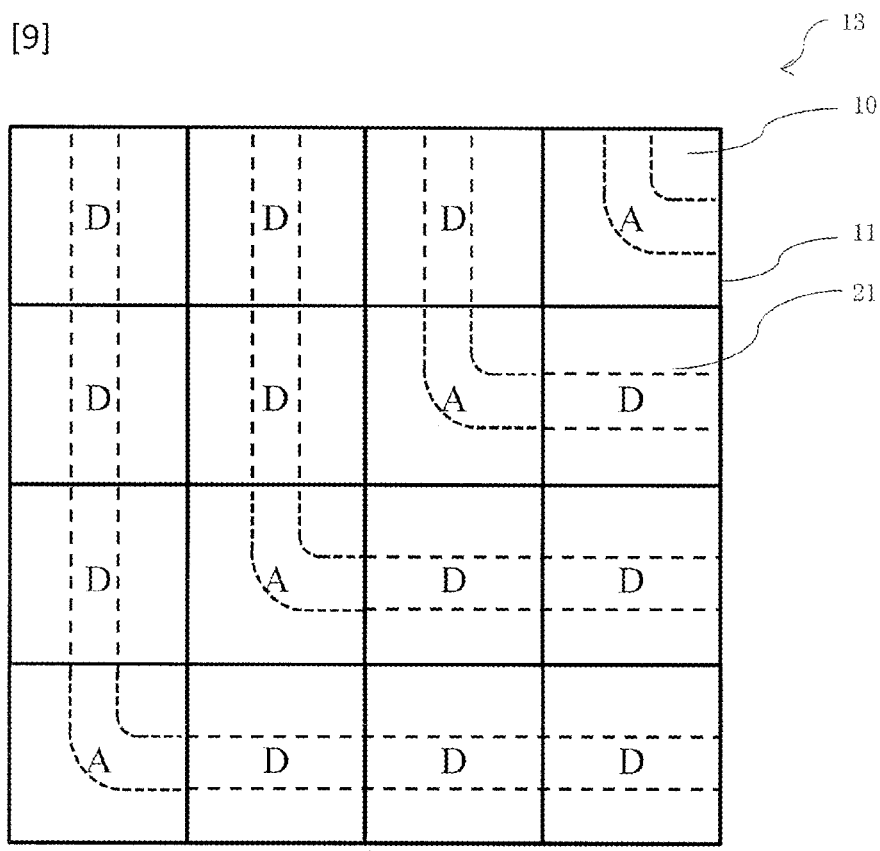
FIG. 9 illustrates a configuration example of a block group for a cable.

As for the blocks for a cable in FIG. 9, 4 blocks for a cable of "type A" and 12 blocks for a cable of "type D" are coupled together in 4 vertical columns and in 4 horizontal rows. This will be referred to as a block group for a cable of "L" pattern. The block group 13 for a cable of "L" pattern changes, by 90 degrees, the extension direction of a cable from a neighboring block group for a cable and causes the cable to pass through the block group 13 of "L" pattern to a neighboring block group for a cable.

In installing the block group 13 for a cable of "L" pattern, the block group 13 for a cable of "L" pattern is rotated by a unit of 90 degrees around, as the center, a perpendicular axis connecting the center of an upper surface with the center of a bottom surface, and a cable can thereby be caused to pass through the block group 13 while bending in arbitrary directions such as forward and leftward, leftward and rearward, rearward and rightward, or rightward and forward. Further, in installing the block group 13 for a cable of "L" pattern, even when upper and lower sides of the block group 13 for a cable of "L" pattern are inverted, the block group 13 is structurally the same.

When the number of cables is small, the block for a cable of "type B" may be coupled instead of the block for a cable of "type D".

Figure 10:
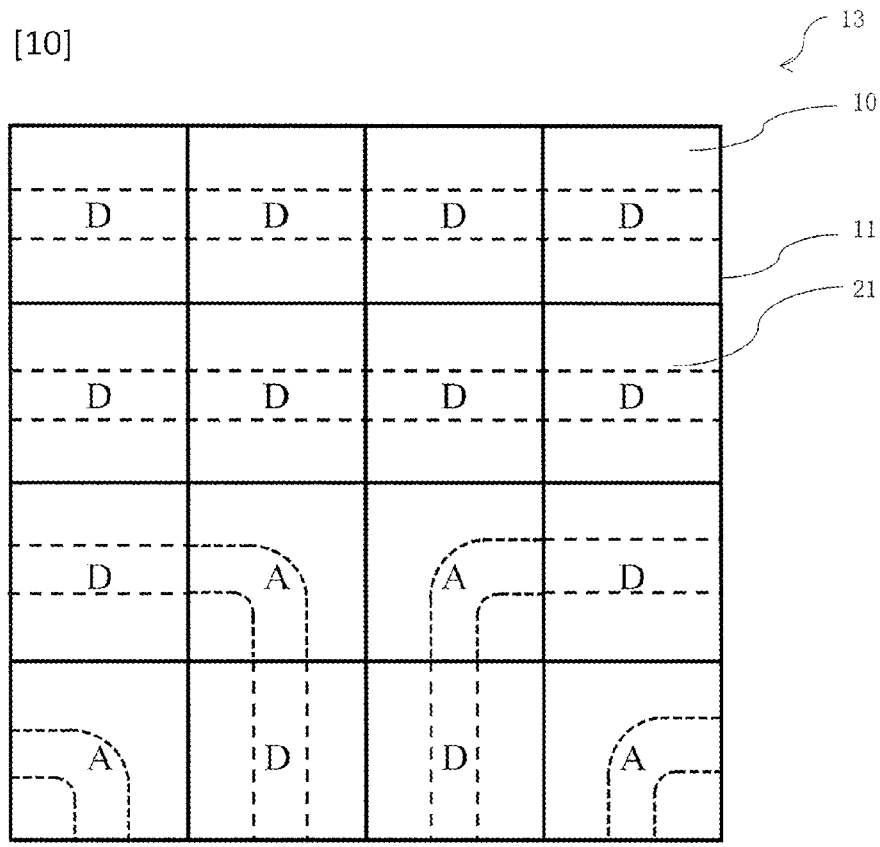
FIG. 10 illustrates a configuration example of a block group for a cable.

As for the blocks for a cable in FIG. 10, 4 blocks for a cable of "type A" and 12 blocks for a cable of "type D" are coupled together in 4 vertical columns and in 4 horizontal rows. This will be referred to as a block group for a cable of "T" pattern. The block group 13 for a cable of "T" pattern causes a portion of cables from a neighboring block group for a cable to pass through the block group 13 of "T" pattern to a neighboring block group for a cable on the opposite side in the same direction, changes the extension direction of a portion of cables by 90 degrees, and causes the portion to pass through the block group 13 of "T" pattern to a neighboring block group for a cable. When the number of cables is small, the block for a cable of "type B" may be coupled instead of the block for a cable of "type D".

In installing the block group 13 for a cable of "T" pattern, the block group 13 for a cable of "T" pattern is rotated by a unit of 90 degrees around, as the center, a perpendicular axis connecting the center of an upper surface with the center of a bottom surface, and a cable can thereby be caused to pass through the block group 13 while bending in arbitrary directions such as forward and leftward, leftward and rearward, rearward and rightward, rightward and forward, forward and forward, or rearward and rearward. Further, in installing the block group 13 for a cable of "T" pattern, even when upper and lower sides of the block group 13 for a cable of "T" pattern are inverted, the block group 13 is structurally the same.

Figure 11:
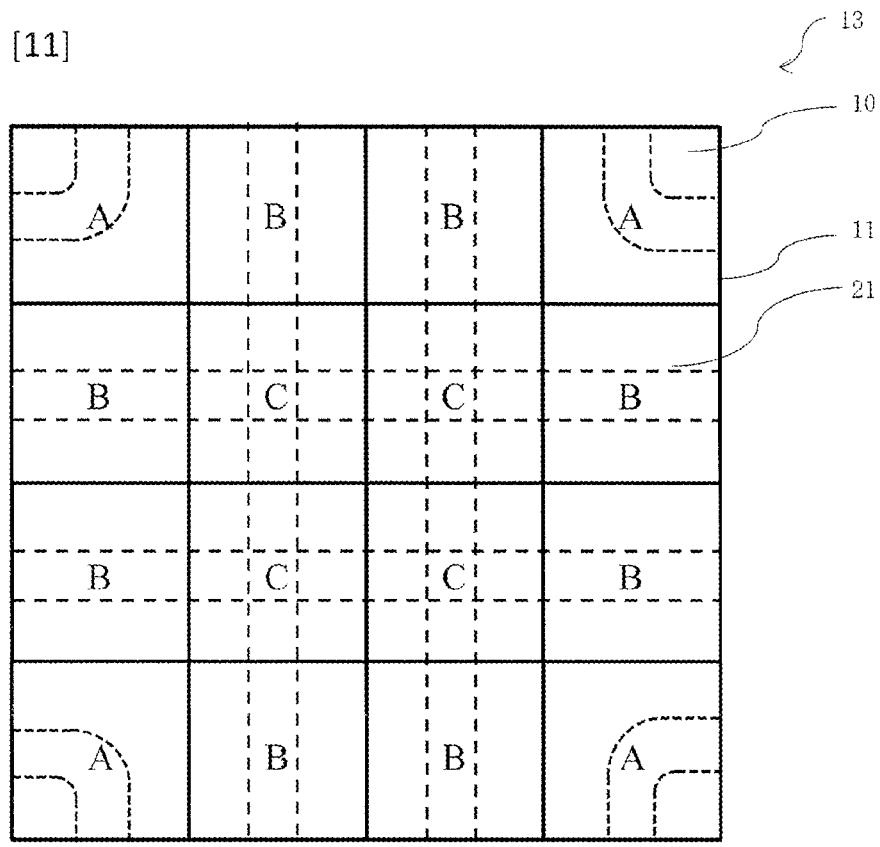
FIG. 11 illustrates a configuration example of a block group for a cable.

As for the blocks for a cable in FIG. 11, four blocks for a cable of "type A", eight blocks for a cable of "type B", and four blocks for a cable of "type C" are coupled together in four vertical columns and in four horizontal rows. This will be referred to as a block group for a cable of "+(plus sign)" pattern. The block group 13 for a cable of "+" pattern causes a portion of cables from a neighboring block group for a cable to pass through the block group 13 of "+" pattern to a neighboring block group for a cable on the opposite side in the same direction, changes the extension direction of a portion of cables by 90 degrees, and causes the portion to pass through the block group 13 of "+" pattern to a neighboring block group for a cable. When a portion of cables from a neighboring block group for a cable is caused to pass through the block group 13 of "+" pattern to a neighboring block group for a cable on the opposite side in the same direction, as for cables from the orthogonal directions, cables in the left-right direction and the front-rear direction are caused to pass through the blocks for a cable of "type C" without intersecting with each other.

As for the block for a cable of "type C", such that the positions of the open ends correspond to those of a neighboring block for a cable of "type C", the block for a cable is rotated by 90 degrees around, as the center, a perpendicular axis connecting the center of the upper surface with the center of the bottom surface, or upper and lower sides are inverted. Further, in a case where the block for a cable of "type B" neighbors the block for a cable of "type C", such that the positions of the open ends correspond between those, the block for a cable of "type B" or the block for a cable of "type C" is coupled with the other without any change or coupled with the other while upper and lower sides are inverted. The block for a cable of "type D" may be coupled instead of the block for a cable of "type B". In this case, a portion of the through holes of the block for a cable of "type D" are not used.

FIG. 8 to FIG. 11 illustrate typical patterns. Configurations of the block group 13 for a cable do not adhere to those, but the blocks 10 for a cable of arbitrary types may be combined together. With a patterned block group for a cable, because wiring design of a cable can be performed by combining the block groups for a cable together, wiring design is facilitated.

(Wiring Method)

In a wiring method of the present disclosure, the plural block groups for a cable according to the above description are arranged in a lattice manner, and a cable is caused to pass through the through holes.

In a wiring method of the present disclosure, the plural block groups for a cable according to the above description whose heights are lower than a double floor are arranged under the double floor in a lattice manner, and a cable is caused to pass through the through holes.

Figure 12:
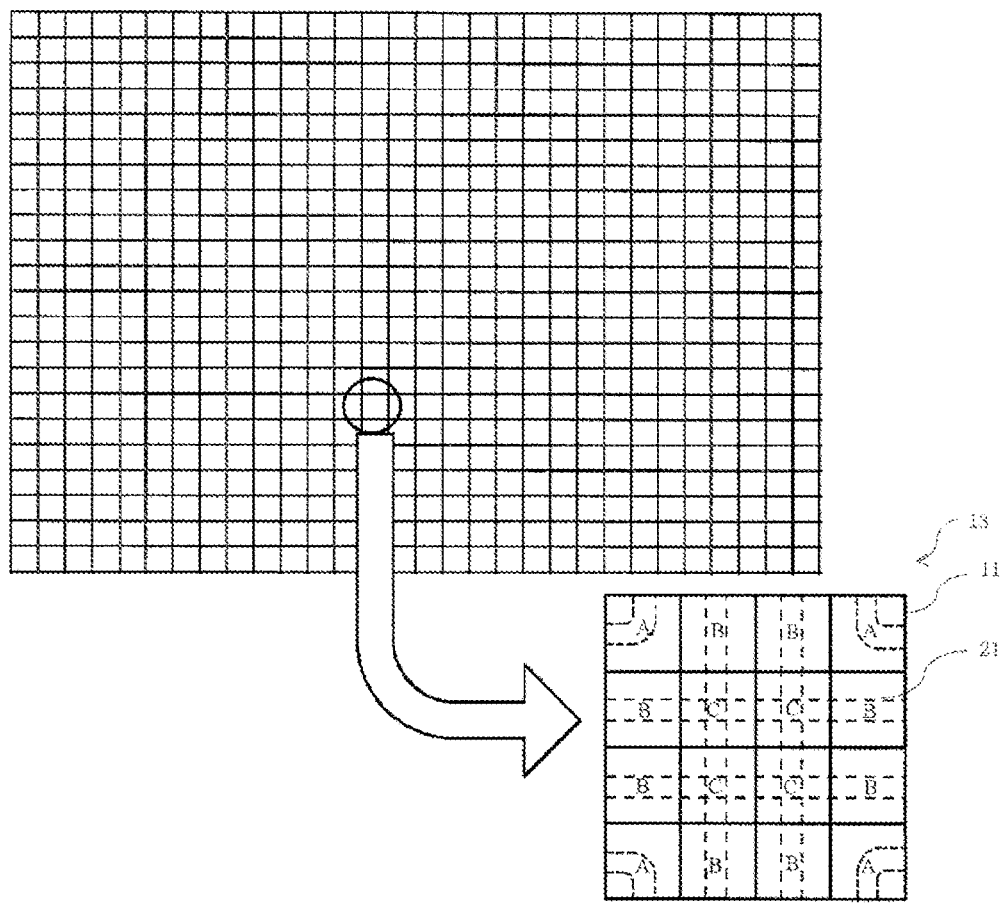
FIG. 12 illustrates a story plan view and a configuration example of block groups for a cable.

A plan view of a story of a machine room of a communication station building or a data center is illustrated in a left upper part of FIG. 12. The machine room usually has a double-floor structure. Panels of the double floor have square shapes and are arranged in a lattice manner. A panel supported by plural pillars is caused to correspond to one unit section as a minimum unit section, and the machine room is demarcated by the unit sections. For one unit section, the above-described block group for a cable is arranged. That is, plural block groups for a cable are arranged in a lattice manner, and cables are caused to pass through the through holes of the blocks for a cable. When the block groups for a cable are arranged under the double floor of the machine room, a cable can be wired from an arbitrary unit section to an arbitrary unit section.

A configuration example of the block group for a cable, the block group being arranged in one unit section of the machine room, is illustrated in a right lower part of FIG. 12. In the right lower part of FIG. 12, a reference numeral 11 denotes an upper surface of the block for a cable, a reference numeral 12 denotes a through hole, a reference numeral 13 denotes a block group for a cable, and reference characters A, B, C, and D respectively denote "type A", "type B", "type C", and "type D" of the block for a cable. The block group 13 for a cable which is illustrated in this example is the above-described block group for a cable of "+(plus sign)" pattern. The block group 13 for a cable may be a combination of the blocks for a cable in an arbitrary configuration. The block group for a cable may be kept installed on a bottom surface under the double floor, and the block groups for a cable may be coupled together.

When the wiring method of the present disclosure is used, a cable is prevented from being piled up due to concentration of the cable into a part. In addition, a cable can be wired in an arbitrary direction under a double floor.

Figure 13:
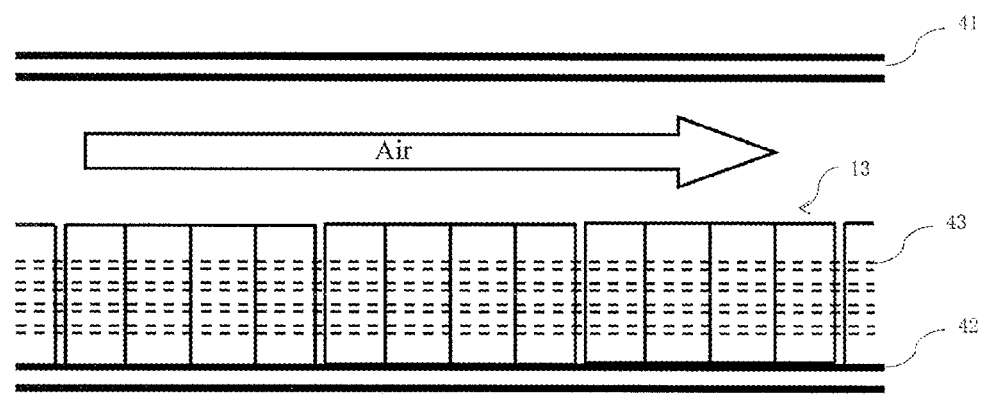
FIG. 13 illustrates block groups for a cable which are arranged under a double floor.

The block groups for a cable which are arranged under the double floor of the machine room of a communication station building or a data center is illustrated in FIG. 13. In FIG. 13, a reference numeral 13 denotes a block group for a cable, a reference numeral 41 denotes a double floor, a reference numeral 42 denotes a bottom surface under a double floor, and a reference numeral 43 denotes a cable. In FIG. 13, on the bottom surface 42 under the double floor, plural block groups 13 for a cable whose heights are lower than the height of the double floor are arranged in a lattice manner. When a cable is caused to pass through the through holes of the block groups 13 for a cable, a cable is prevented from being piled up due to concentration of the cable into a part of a double floor.

Because the heights of the block groups 13 for a cable are unified, an upper surface of plural arranged block groups 13 for a cable form a surface with little unevenness. In addition, because the heights of the block groups 13 for a cable are lower than the height of the double floor, an air-conditioning airflow for cooling devices efficiently flows through a space under the double floor between the double floor 41 and the upper surface of the block groups 13 for a cable.

INDUSTRIAL APPLICABILITY

The present disclosure can be applied to information and communication industry.

REFERENCE SIGNS LIST 10 block for cable
11 upper surface
12 side surface
13 block group for cable
21 through hole
22 open end of through hole
31 middle line between upper side and bottom side of side surface
32 middle line between lateral side and lateral side of side surface
41 double floor
42 bottom surface under double floor
43 cable

The invention claimed is:
1. A block for a cable, wherein
the block has a shape of a rectangular cuboid in which an upper surface and a bottom surface have square shapes, the block has plural bending through holes between one side surface of the rectangular cuboid and a side surface neighboring the one side surface,
arrangement of open ends of the plural through holes in the one side surface of the rectangular cuboid is in a lattice manner,
the arrangement of the open ends is in line symmetry with respect to a middle line between an upper side and a bottom side of the one side surface and with respect to a middle line between a lateral side and a lateral side of the one side surface, and
arrangement of open ends of the plural through holes in the side surface neighboring the one side surface of the rectangular cuboid is the same as the arrangement of the open ends of the plural through holes in the one side surface of the rectangular cuboid.

2. A block group for a cable, wherein the plural blocks for a cable according to claim 1, which have bottom surfaces with the same size and the same height and between side surfaces of which arrangements of open ends of plural through holes correspond to each other, are coupled together via side surfaces.

3. A wiring method, wherein
the plural block groups for a cable according to claim 2 are arranged in a lattice manner, and a cable is caused to pass through the through holes.

4. A wiring method, wherein
the plural block groups for a cable according to claim 2 whose heights are lower than a double floor are arranged under the double floor in a lattice manner, and a cable is caused to pass through the through holes.

5. A configuration method of a block group for a cable, wherein the plural blocks for a cable according to claim 1, which have bottom surfaces with the same size and the same height and between side surfaces of which arrangements of open ends of plural through holes correspond to each other, are coupled together via side surfaces, and a cable wiring route is secured.

6. A block for a cable, wherein
the block has a shape of a rectangular cuboid in which an upper surface and a bottom surface have square shapes,
the block has plural through holes extending straight between one side surface of the rectangular cuboid and a side surface opposed to the one side surface,
arrangement of open ends of the plural through holes in the one side surface of the rectangular cuboid is in a lattice manner and corresponds, of a first group and a second group, to the first group wherein the first group and the second group are defined so that alignment in line symmetry with respect to a middle line between an upper side and a bottom side of the one side surface and with respect to a middle line between a lateral side and a lateral side of the one side surface is divided into the first group and the second group, the open ends at the same height from the bottom surface belonging to the same group, the open ends of the first group and the open ends of the second group being in rotational symmetry with respect to a center of the one side surface, and
arrangement of open ends of the plural through holes in the side surface opposed to the one side surface of the rectangular cuboid is the same as the arrangement of the open ends of the plural through holes in the one side surface of the rectangular cuboid.

7. A block for a cable, wherein
the block has a shape of a rectangular cuboid in which an upper surface and a bottom surface have square shapes, the block has plural through holes extending straight between one side surface of the rectangular cuboid and a side surface opposed to the one side surface, the block has plural through holes extending straight between side surfaces neighboring the one side surface of the rectangular cuboid, arrangement of open ends of the plural through holes in the one side surface of the rectangular cuboid is in a lattice manner and corresponds, of a first group and a second group, to the first group wherein the first group and the second group are defined so that alignment in line symmetry with respect to a middle line between an upper side and a bottom side of the one side surface and with respect to a middle line between a lateral side and a lateral side of the one side surface is divided into the first group and the second group, the open ends at the same height from the bottom surface belonging to the same group, the open ends of the first group and the open ends of the second group being in rotational symmetry with respect to a center of the one side surface, and arrangement of open ends of the plural through holes in the side surface neighboring the one side surface of the rectangular cuboid corresponds to the second group.

\* \* \* \* \*